May 25, 1965 K. K. N. CHANG 3,185,937

MAGNETO-RESISTANCE NONRECIPROCAL SIGNAL AMPLIFIER

Filed Feb. 27, 1961 3 Sheets-Sheet 1

INVENTOR.
KERN K.N. CHANG
BY Eugene M. Whitacre
Attorney

May 25, 1965 K. K. N. CHANG 3,185,937

MAGNETO-RESISTANCE NONRECIPROCAL SIGNAL AMPLIFIER

Filed Feb. 27, 1961 3 Sheets-Sheet 2

INVENTOR.
KERN K.N. CHANG
BY Eugene M. Whitacre
Attorney

MAGNETO-RESISTANCE NONRECIPROCAL SIGNAL AMPLIFIER

Filed Feb. 27, 1961 3 Sheets-Sheet 3

INVENTOR.
KERN K. N. CHANG
BY Eugene M. Whitacre
Attorney

United States Patent Office 3,185,937
Patented May 25, 1965

3,185,937

MAGNETO-RESISTANCE NONRECIPROCAL SIGNAL AMPLIFIER

Kern K. N. Chang, Princeton, N.J., assignor to Radio Corporation of America, a corporation of Delaware Filed Feb. 27, 1961, Ser. No. 91,902
15 Claims. (Cl. 330—63)

The present invention relates to nonreciprocal signal amplifiers, and more particularly to solid-state nonreciprocal signal amplifiers for utilizing magneto-resistance effects in semiconductor materials for signal amplification and control.

Many two-terminal negative-resistance devices, such as masers, parametric and tunnel-diode amplifiers, require circulators or other nonreciprocal devices as interstage coupling elements to minimize noise in signal translation and to stabilize performance. While there are many nonreciprocal amplifier or signal translating devices, such as electronic tubes and transistors, ferrite gyrators, etc., most are useful only at relatively low frequencies. Ferrite gyrators are capable of microwave applications, but they are passive and lossy. Communications and computer systems provide increasing uses for nonreciprocal solid-state high frequency signal amplifiers and signal translating circuits.

It is therefore an object of the present invention to provide an improved nonreciprocal signal-translating circuit or amplifier which is particularly adapted for use with communications and computor systems, and which will not only operate at relatively low frequencies, but will also operate at relatively high frequencies as well.

It is a further object of this invention to provide an improved magneto-resistance signal-translating or amplifier circuit which has enhanced magneto-resistance effect whereby increased signal control or amplification may be obtained with relatively low magnetic field variations.

Semiconductor materials, such as germanium, indium antimide or the like, provide a variable-resistance effect between two spaced surface contacts or electrodes in response to variation in a magnetic field passing through a body of such material. An electrical field applied through the contacts or electrodes from a direct-current source results in a variable current flow between the electrodes by reason of the resistance variation. A signal translating or amplifier circuit in accordance with the invention is based upon a new and enhanced magneto-resistance effect which is derived by providing two sets of electrostatic potentials or fields in addition to the variable magnetic field on a semiconductor body.

In one form of the invention, a semiconductor rectangular wafer or body, with two sets of ohmic contacts or electrodes, energized from suitable direct-current sources, is placed under the influence of two cross electric current fields from these sets of electrodes in one plane through the body, as well as the magnetic field which is applied substantially at a right angle to the common plane of the two electric current fields. The current change in the resistive path or connection between one set of contacts is a function of the magnetic field change and has been found to be greatly enhanced by the presence of the second electric field across the second set of contacts or electrodes.

At some values of relative electric field potentials or intensities applied to the two sets of contacts or electrodes, the incremental change in resistance between one set chosen for output circuit connection, can be made extremely sensitive to the change or variation in the magnetic field. The degree of sensitivity that can be obtained in this way has not heretofore been considered possible with any previous magneto-resistance devices. One difficulty with magneto-resistance devices heretofore lies in the fact that the sensitivity is usually so low that a prohibitively strong magnetic field has to be applied to the controlled semiconductor body or element before any useful magneto resistance effect is possible.

Prior magneto-resistance devices and circuits were limited to the use of one electrostatic or electric current field along one parameter or dimensional direction of the semiconductor body or element. It has been found that this leaves the body or element freely charged along other parameters or cross-dimensional directions and it has been found that these free charges greatly reduce the magneto-resistance control or change that can be obtained by variation of the magnetic field.

It is therefore a still further object of this invention to provide an improved magneto-resistance signal-translating or amplifier circuit wherein effective reduction or removal of free charges in the main current-controlling path through the magneto-resistance element thereof and a greatly enhanced or wide range of magneto-resistance control from substantially zero to relatively high values may be attained at substantially all frequencies.

This concept of increasing the magneto-resistance control range of a signal translating or amplifier circuit potentially makes possible effective nonreciprocal isolator, amplifier, converter or like signal translating circuits at microwave frequencies.

It is also a further and important object of this invention to provide an improved magneto-resistance amplifier or like signal translating circuit having the enhanced magneto-resistance effect derived from the use of two sets of electrostatic or electrical fields and which also admits of a cascaded circuit arrangement for the semiconductor magneto-resistance elements whereby smaller or lesser magnetic and electrical fields can be used to attain the same desirably high degrees of signal amplification.

Thus an amplifier or signal translating circuit in accordance with the invention may include a series of spaced signal-current-conveying conductors or loop coils connected so that signal currents in adjacent conductors or coils are opposed and create a magnetic field distribution through successive spaced and aligned semiconductor elements between the conductors or loop coils which alternates in polarity and passes through the successive semiconductor elements for effectively controlling the magneto-resistance between the signal controlling electrodes or contacts thereof. The improved circuit of the invention provides relatively strong signal or RF magnetic fields between adjacent conductors or loop coils and permits the semiconductor elements spaced and aligned along therebetween to be connected serially for high signal gain and control in a suitable signal translating or output circuit.

A fixed biasing magnetic field provided by suitable means such as permanent bar magnets, or electromagnets, is applied to the semiconductor elements along a common direction or axis with the signal or RF magnetic fields. Thus each semiconductor magneto-resistance element has a fixed magnetic field superimposed by a variable signal or RF magnetic field, and two electrostatic or electric current fields in a plane substantially at a right angle to the said common axis of the magnetic fields. Input signals for translation or amplification are applied to the spaced conductors or loop coils from suitable signal supply means which may include a tunable signal input circuit provided with variable tuning means such as a tuning capacitor or the like. As will be seen, the signal circuit may be coupled to or directly connected in circuit with the spaced conductors or loop coils.

Magneto-resistance modulation takes place in each semiconductor element through enhanced magneto-resistance effect as above referred to. Since the semiconductor units are connected in series aiding and effectively magnetically coupled with the conductors of the modulating means, the modulation effect is cumulative and provides an amplified signal component in any suitable output circuit coupled with the semiconductor signal translating circuit. A source of direct-current energy for supplying the power for amplification or signal gain of the system is included in connection with this circuit, and supplies operating current through the series of semiconductor units. The invention will further be understood from the following description when considered in connection with the accompanying drawings, and its scope is pointed out in the appended claims.

In the drawings, FIGURE 1 is a schematic circuit diagram of a magneto-resistance amplifier embodying the invention;

Figure 1:
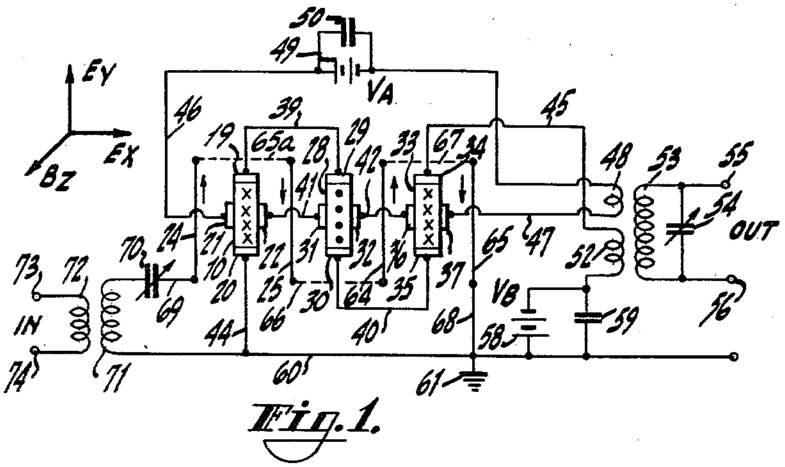
Figure 2:
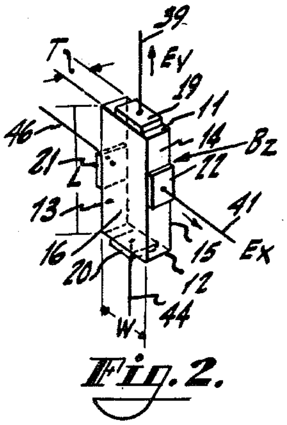
FIGURE 2 is an enlarged view, in perspective, of a magneto-resistance device in accordance with the invention, as used in the circuit of FIGURE 1.

Referring to FIGURES 1 and 2 of the drawings, the magneto-resistance amplifier includes an amplifier device comprising a body 10 of semiconductor material, such as germanium or indium-antimony for example, of rectangular shape having spaced, substantially-parallel, end surfaces 11 and 12 on an extended longitudinal axis, which is the vertical axis in the figures referred to, and two pairs of opposite, substantially-parallel side surfaces 13–14 and 15–16 on orthogonally-related transverse axes or centers through the body or element. Four electrodal elements or contacts, which are substantially alike in size, are centrally positioned in pairs on one pair of side surfaces 13, 14 and on the end surfaces 11, 12. As shown more clearly in FIGURE 2, a first pair of the electrodal elements or contacts 19 and 20 is located on the end surfaces 11 and 12 respectively, and a second pair of electrodal elements or contacts 21 and 22 are located on the side surfaces 13 and 14 respectively. Means including spaced signal conductor elements 24 and 25 on opposite sides of and extending along the longitudinal axis in inductive or magnetic-coupling relation to the semiconductor body or element 10 are provided for applying a signal-variable magnetic field transversely through said body between the other (15–16) of said pairs of side surfaces.

In the circuit of FIGURE 1, and as shown more clearly in FIGURE 2, the rectangular body 10 of semiconductor material is provided with four spaced electrodal surface contact elements arranged thereon in opposed pairs 19–20 and 21–22 along two different axes of which one is longitudinally of the body, between the contact elements 19 and 20, and the other of which is transversely thereof between the contact elements 21 and 22, and both in substantially a common plane which, in the present example, is vertical as viewed in the drawing.

The conductors 24 and 25 are part of means for applying a transverse signal-variable unidirectional magnetic field through the body along a third axis $B_z$ indicated by the arrowed line in FIGURES 1 and 2, which is substantially orthogonal to the common plane above referred to. Means as hereinafter described are connected with the pairs of contact elements for applying direct-current voltages and operating currents thereto in predetermined relation to establish electrostatic or electric current fields $E_y$ and $E_x$ in the body of semiconductor material. As hereinafter described, the relation of said voltages or fields is such that a high degree of sensitivity to magnetic field variations for magneto-resistance variation of longitudinal current flow through the body and the electrodal contact elements therefor, such as the contacts 19–20, is provided, thereby to attain a higher degree of amplification than has heretofore been obtained with nonreciprocal amplifiers and for high frequency applications in the microwave field for example.

To multiply and enhance this effect further, a plurality of the magneto-resistance devices as described, may be provided in spaced aligned relation and connected in aiding series or cascade relation in both a control and a signal translating circuit. By way of example, two additional magneto-resistance control devices, like that shown in FIGURE 2, are provided in the amplifier of the present example, and aligned with the first in a row as shown. Thus the second amplifier device comprises a rectangular body 28 of semiconductor material having one pair of end contact elements 29 and 30 and a pair of transverse side contact elements 31 and 32. The third amplifier device likewise comprises a similar body 33 of semiconductor material having end contact elements 34 and 35 and transverse side contact elements 36 and 37.

For operation in the system shown, the pairs of end contact elements are connected serially together through end conductors 39 and 40 connected respectively between the contact elements 19 and 29 and the contact elements 30 and 35. Likewise the transverse contact elements 22 and 31 are connected by a series conductor 41 and the contact elements 32 and 36 are connected by a series conductor 42. In this way, the pairs of end contact elements are connected serially or in tandem or cascade relation between one pair of circuit leads 44 and 45 and the transverse pairs of contact elements are connected serially or in tandem or cascade relation between a second pair of circuit leads 46 and 47.

The leads 46 and 47 are part of a biasing or control circuit which is completed through a coupling winding 48 and a source of direct current voltage $V_A$ which may be provided by a battery 49, with a suitable signal bypass capacitor 50 therefor. In this way the biasing source $V_A$ and the winding are connected serially between the leads 46 and 47 whereby current from the source or battery flows through the semiconductor bodies transversely from side to side through the electrodal contacts or contact elements, the resistance of the bodies being in series or cascaded for greater control effect as will hereinafter appear.

In the same manner, the end electrodes are connected through the leads 44 and 45 as part of a signal translating circuit having an output coupling impedance 52 and a source of operating voltage $V_B$ series. In the present example, the output coupling impedance 52 is the primary winding of an output coupling transformer, the secondary 53 of which is tuned to resonance at a desired signal frequency by a shunt using capacitor 54. The secondary 53 is connected to a pair of output terminals 55–56. It should be noted that the winding 48 is inductively coupled with the primary winding 52 for feeding back signals therefrom to the control circuit 46–47 at the same time that signals are fed to the output terminals 55–56 through the secondary 53.

The direct-current source of operating current or voltage $V_B$ for the amplifier may be provided by any suitable means, as represented by a second battery 58. This operating current source $V_B$ is normally of lower voltage than that of the control voltage source $V_A$ in an amplifier circuit of this type. The operating source $V_B$ is provided with a signal bypass capacitor 59, and the return circuit connection from the lead 45 through the primary winding 52 and the operating source $V_B$ or battery 53 to the circuit lead 44 is completed through a common return conductor 60 which is connected with or forms part of common ground or chassis 61 for the system.

The magnetic or inductive coupling means for the additional magneto-resistance devices 28 and 33 includes two additional signal conductor elements 64 and 65 on opposite sides of and extending along the longitudinal axis of the semiconductor body or element 33. The conductor elements 24, 25, 64 and 65 are thus arranged in substantially-parallel spaced relation to each other and to the semiconductor bodies which are located between them, thereby providing magnetic or inductive coupling for each of the bodies or elements through the conductors on opposite sides thereof.

For this purpose, therefore, in accordance with the invention, the semiconductor bodies are located in substantially equally spaced relation to each other and to the signal conductor elements as above noted, whereby the semiconductor bodies are modulated by an incoming signal through a modulating or input circuit comprising the conductor elements 24, 25, 64 and 65 connected in series for conducting current in opposite directions on opposite sides of each semiconductor body. This circuit connection is provided through end conductor means indicated by the dotted connection line 65*a* between the conductors 24 and 25, the dotted connection line 66 between the conductors 25 and 64, and the dotted connection line 67 between the conductors 64 and 65. The conductor 65 is connected with a circuit lead 68, and the conductor 24 is connected with a circuit lead 69 in which is connected serially a variable tuning capacitor 70 and a signal input coupling impedance element 71 which is the secondary winding of an input coupling transformer, the primary 72 of which is connected with signal input terminals 73 and 74. The low potential side of the secondary winding 71 is connected through the common ground or chassis 60–61 to the lead 68, for completing the signal input circuit.

In the circuit arrangement shown, the conductors 24, 25, 64 and 65 provide means for applying a transverse signal-variable magnetic field through the bodies or body with which they are associated along the third or magnetic axis Bz substantially orthogonally to the plane of the two magneto-resistive paths respectively longitudinally and transversely through each body. The polarities of the magnetic fields set up by the signal conveying conductors are mutually aiding through each semiconductor body and alternate in opposite directions in the successive semiconductor elements of the amplifier.

In addition to the signal-variable magnetic fields thus applied to the semiconductor amplifier elements through the signal conveying coupling conductors or elements 24, 25, 64 and 65, a fixed magnetic field is applied to each element, preferably by permanent magnetic means associated therewith. In the present example, this is provided for directing and establishing magnetic flux fields through the semiconductor bodies 10, 28 and 33 alternately in opposite directions as indicated by like directional X markings or symbols on the bodies 10 and 33 designating flux flow into the plane of the drawing and differing dot markings or symbols on the body 28 designating flux flow out of the plane of the drawing. The manner in which the signal flows and the fixed magnetic flux paths are related and coupled with the semiconductor units will be understood more readily from a consideration of the diagrammatic representations shown in FIGURES 3 and 4 to which, along with FIGURES 1 and 2, attention is now directed.

Figure 3:
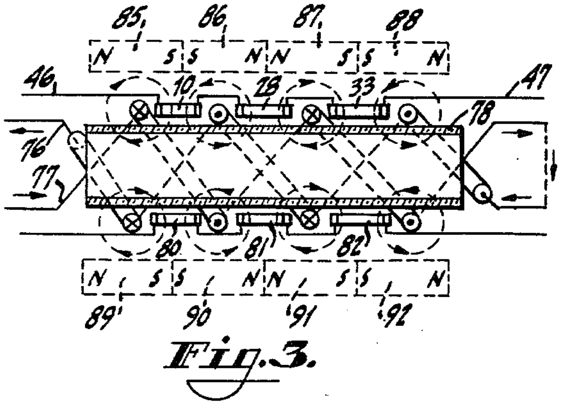
FIGURES 3 and 4 are diagrammatic representations of the signal-variable and fixed magnetic field elements and relations in an amplifier in accordance with the invention.
Figure 4:
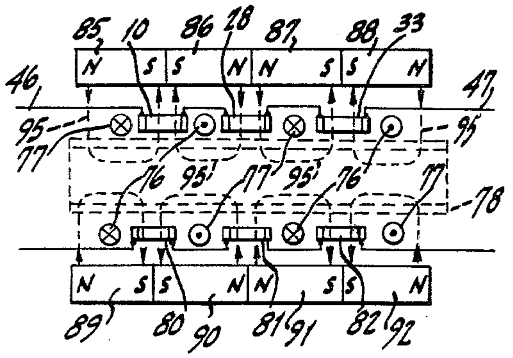

In FIGURES 3 and 4 the semiconductor units as shown in FIGURE 1, are provided in two rows or groups, or in upper and lower tiers as viewed in the drawing, since two groups of elements are provided to take advantage of the enhanced gain both in control and amplification by the tandem or cascaded circuit arrangement of an increased number of magneto-resistance elements, as before referred to.

Therefore, in these diagrammatic representations, it may be assumed that the three semiconductor elements 10, 28 and 33 are located between signal input coupling conductors which may be provided readily and conveniently by two bifilar conductors 76 and 77 of a bifilar helical winding on insulating support means such as an insulating tubular form 78. The turns of the winding 76, 77 are sufficiently widely spaced to permit the semiconductor elements 10, 28, 33 to be located and mounted therebetween as shown, and the winding is so connected, for example as shown in FIGURE 3, as to permit signal current flow therethrough to be in opposite directions in conductors on opposite sides of each semiconductor element.

The magnetic fields induced in the semiconductor bodies from signal current flow in the conductors are thus mutually aiding and in the same direction through each semiconductor device or element from adjacent conductors, and alternately in opposite directions through the successive semiconductor elements, all as indicated by the dotted circular closed loops with arrowed directional indicators thereon in FIGURE 3. The arrows indicate the instantaneous current flow and magnetic field directions which, with alternating-current signals, are constantly reversing, as is understood. In FIGURE 3 the end contacts or electrodal elements do not appear but only the transverse electrodal elements for the various semiconductor devices or bodies and those are serially connected between the conductors 46 and 47 as in FIGURE 1 and for the same purpose.

Referring again to the multiple row or tier construction for increasing the number of units in use, since the conductors are in helical form, several sets of semiconductor devices may be inserted between the turns for receiving magnetic coupling in the same manner as for the elements 10, 28 and 33. Such an additional set of semiconductor devices is indicated at 80, 81 and 82 in the lower row or tier, as viewed in FIGURES 3 and 4. These represent any number of such sets of devices that may be connected in cascade with or operated independently of the first and other sets of such devices located between the turns of the double helix formed by the bifilar winding 76, 77, or other suitable coupling means.

The permanent magnetic field for the semiconductor elements hereinbefore referred to, is provided by a series of permanent bar magnets positioned along the upper tier or row of semiconductor elements, as indicated by the dotted lines at 85, 86, 87 and 88 in FIGURE 3 and by the same elements in solid lines in FIGURE 4. A similar set of magnets 89, 90, 91 and 92 are likewise provided for each additional set of semiconductor elements such as the second or lower tier set 80, 81 and 82 in the present example. The permanent magnetic field means provided by the bar magnets is one having successive opposite polarities along each series or group of cascaded magneto-resistive or semiconductor elements. For example, as shown, the bar magnets are placed end-to-end, with like polarity junctions in registration with the successive semi-conductor elements to provide flux flow therethrough from two adjacent bar magnets in the same direction but alternating in polarity from unit to unit.

In the present example, therefore, the bar magnets 85 and 86 provide two south (S) poles over the semiconductor element 10, and two north (N) poles are likewise provided over the semiconductor element 28 by the bar magnets 86 and 87. The south polarity junctions of the bar magnets 87 and 88 are then in registration with the semiconductor element 33. The directional flux paths from the N to S poles of the successive bar magnets are indicated by the dotted arrowed lines 95. The similar flux path relations and polarities for the magnetic fields as provided for the semiconductor elements 80, 81 and 82 are likewise indicated.

Comparing the magnetic fields in FIGURES 3 and 4, it will be seen that the magnetic flux provided in each of the semiconductor elements 10, 28 and 33 along the B*z* axes, by reason of the permanent magnet field means, is alternately aided and opposed along the same axis in each element by the signal flow through the coupling elements, such as the elements 24, 25, 64 and 65 in FIGURE 1 and the corresponding bifilar winding elements 76 and 77 in FIGURES 3 and 4.

Thus the magnetic flux is caused to vary at the signal frequency in the magneto-resistance or semiconductor units or elements and causes magneto-resistive modulation of the current from the D.-C. power source $V_B$ which is applied to the output circuit through the coupling means 52 as shown in FIGURE 1. The input signal at the terminals 73–74 is thus amplified by magneto-resistance action and appears at the output terminals 55–56. Because of the plurality of magneto-resistance elements in the cascade connection as provided by the circuit 44–45, a relatively high degree of signal amplification can be attained with lesser or smaller fixed magnetic and electrical fields and related elements.

The introduction of the additional electric current field, through the control circuit 46–47 from the voltage source $V_A$ or battery 49, provides for a higher degree of amplification per unit or element of each cascaded circuit. This is by reason of the fact that the incremental change in resistance by the various magneto-resistance elements in the signal translating circuit can be made extremely sensitive to changes in the magnetic field, such as are produced by incoming signals. As pointed out hereinbefore, this high sensitivity has not been achieved in any known magneto-resistance circuit because the required magnetic field strength must be prohibitively large. This results from the limitation in the use of one electric current field along the E*x* or E*y* axis or dimensional direction of the semiconductor body whereby free charges along one axis or dimensional direction always remain to reduce the magneto-resistance control or change that can be attained in any practical way.

In accordance with the present invention, the additional control circuit and direct-current control source $V_A$ are provided and the control voltage is adjusted with respect or in relation to the voltage of the operating current source $V_B$ to attain a condition of operation whereby the free charges in the main current-controlling path through the body of magneto-resistance material are substantially reduced or removed. This permits the flow of current between the electrodes or electrodal elements 19–20, 29–30 and 34–35 to be substantially under full control of the signal variations of the magnetic flux field of each element. This greatly widens the control of the magneto-resistance of each element to relatively high and desirable values as hereinbefore considered.

As the signal varies in the output winding 52 signal feedback through the winding 48 into the biasing or control circuit 46–47 provides signal coupling to dynamically control the charges in the semiconductor devices or elements at the signal frequency or RF rate to maintain dynamically the balance established statically by the voltage sources 58 and 59. Therefore the winding 48 is coupled only sufficiently to provide effective dynamic control of the charges in the semiconductor elements at the signal rate and therefore may be considered as a dynamic balance feedback winding in the control circuit 46–47. It will be noted that the semiconductor control circuit is otherwise decoupled from the signal translating or output circuit and the magnetic modulating or signal input circuit.

Figure 5:
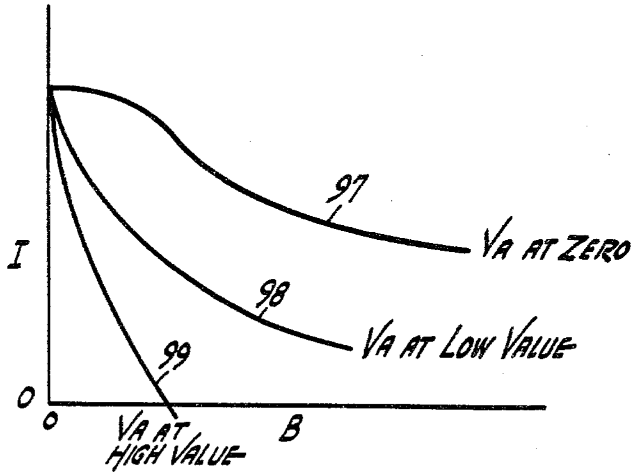
FIGURES 5 and 6 are graphs showing curves illustrating certain operating characteristics of the amplifier of FIGURE 1, in accordance with the invention.
Figure 6:
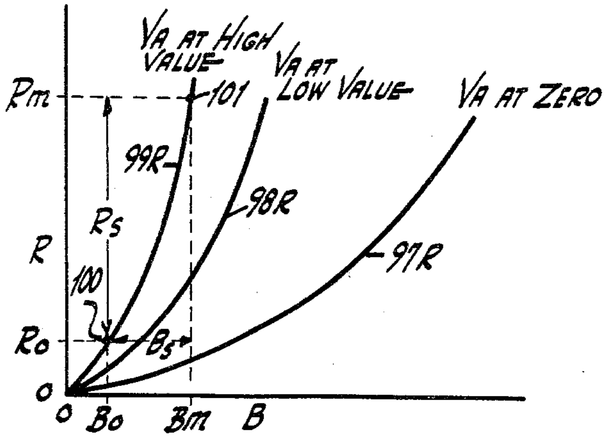

The relation between the signal-variable unidirectional magnetic field through the semiconductor elements along the B*z* axes and the resistance variation and resultant signal current variation in the signal translating circuit connected in the current path E*y*, is shown in relation to the control voltage at the source $V_A$ at different values thereof in FIGURES 5 and 6, to which attention is now directed along with the preceding figures.

These graphs are substantially self-explanatory, that of FIGURE 5 showing relative changes in the current I in the output or signal translating circuit 44–45 for values of control voltage $V_A$ at zero, at a relatively low value, and at a relatively high value, with variation in the magnetic field B, and indicated by the curves 97, 98 and 99 respectively. As indicated by the curve 99, a relatively small change in magnetic flux through the semiconductor element produces a relatively wide change in current in the signal translating circuit. This is by reason of the fact that the resistance of the circuit, that is, the magneto-resistance of each of the successive elements, between the electrodes 19–20, 29–30 and 34–35, varies widely in the same manner.

The resultant resistance variation is indicated in FIGURE 6 by resistance response curves $97_R$, $98_R$ and $99_R$ corresponding respectively to the curves 97, 98 and 99. For example, a change in magnetic flux from a value B*o*, or zero, to a value B*m* or maximum, corresponding to two intercept points 100 and 101 on the curve $99_R$. This provides for a resistance change represented between the value R*o*, or zero, and the value R*m* or maximum. As shown in connection with the curve $99_R$ the value R*s* represents the resistance change resulting from a magnetic flux change B*s* depicted in FIGURE 6. These curves serve to illustrate in graphic form the effect of the control voltage $V_A$ on the system in accordance with the invention.

By way of example it may be noted that in an amplifier like that of FIG. 1, for example, each semiconductor element thereof may comprise a rectangular body of indium-antimony having dimensions, with reference to FIGURE 2, of $L=3/8''$, $T=1/8''$, and $W=1/16''$ to $1/8''$, and with control and operating voltages in ratios of twenty/one (20:1) established between $V_A$ and $V_B$ by adjustment of $V_A$, for example. By this means signal-variable resistance changes in the signal translating circuit of $V_B$ of from 20 to 200 times may be attained in operation. When the voltage at $V_A$ is removed, as represented by the curve 97 and $97_R$ in FIGURES 5 and 6, it will be seen that the same control or signal amplification is unattainable.

Viewed as an overall amplifier system it will be seen that the circuit construction, as described in connection with FIGURES 1, 3 and 3, provides a series of spaced signal conductors or loop coils in substantially parallel relation and connected opposite in polarity or phase so that signal currents in two adjacent conductors or coils turns are opposed to each other. Thus instantaneous signal currents flow alternately in opposite directions through the successive conductors or loop turns when serially connected as shown. This construction provides strong periodic or alternate RF magnetic fields between adjacent signal conductors or loop turns. A series of semiconductor wafers of indium-antimony, germanium or the like, provided with suitable electrodal or contact means and connected in series in two modes, longitudinally and transversely as described, may then be placed in and respond to the successive fields above referred to and obtain signal control and amplification individually and in cascade.

It will be noted that the fixed magnetic field or fields provided by permanent ferrite or like bar magnets is applied to the bodies or wafers of semiconductor material in a corresponding sense or axis with the RF magnetic fields whereby, as hereinbefore pointed out, each body or wafer has a fixed magnetic field super-imposed by an RF magnetic field along one axis thereof other than the axis of either applied electrostatic or electric current field.

In the circuit of FIGURE 1, the input signal is applied to the modulating conductors 24, 25, 64, and 65 in series with resonating means comprising the capacitor 70 and the secondary or input winding 71. These conductors are thus directly in the tuned signal input circuit. However it should be understood that other means may be provided for translating signals at the input circuit into corresponding modulating signals in the conductors 24, 25, 64 and 65 or like coupling means. Resistance modulation takes place in each semiconductor element or unit through the magneto-resistance effect as described and since the units are in series, the modulation effect is cumulative, as is the control effect of the voltage source $V_A$ in the series control circuit. The modulation thus appears as a signal component in the translating circuit including the output coupling impedance means 52 from which the output signal component is derived. The energy derived from the source $V_B$ provides the energy or power for signal amplification.

Figure 7:
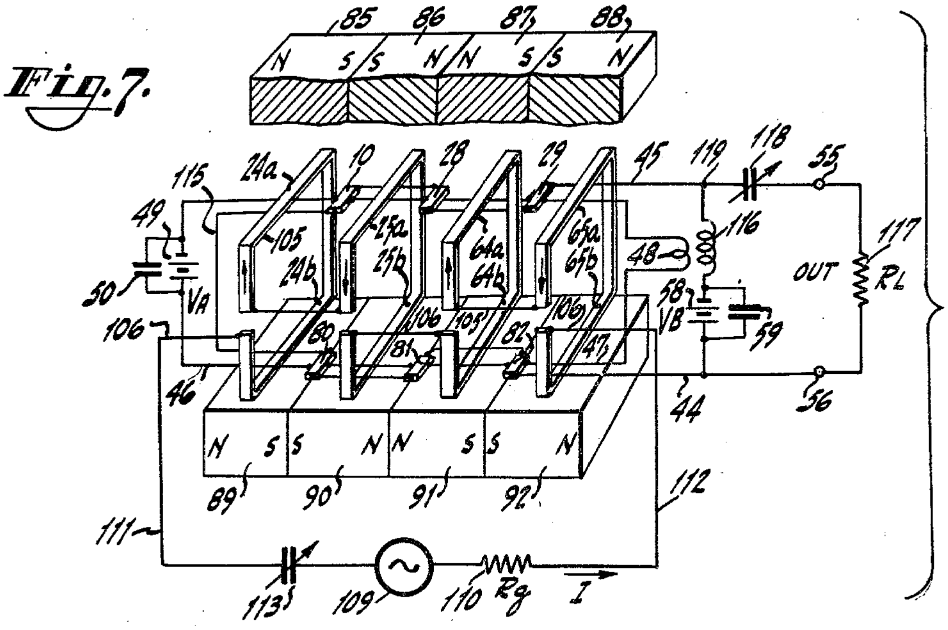
FIGURE 7 is a schematic circuit diagram, with structural representation of certain elements thereof, for an amplifier embodying the invention.

A magneto-resistance nonreciprocal amplifier embodying a plurality of semiconductor or magneto-resistance devices or elements in a circuit like of FIGURE 1, with the magnetic and signal field relations and means of FIGURES 3 and 4, is shown in FIGURE 7 to which attention is now directed. In this modification, the three semiconductor elements 10, 28 and 29, in the upper group or tier, are mounted in spaced parallel relation between similarly spaced magnetic coupling signal conductors 24*a*, 25*a*, 64*a* and 65*a* and are acted upon by permanent magnetic fields provided by the ferrite bar magnets 85, 86, 87 and 88, in accordance with the arrangement as described in connection with FIGURE 4. The semiconductor or magneto-resistance elements 80, 81 and 82 of the lower group or tier are similarly mounted in spaced parallel relation between similarly-spaced conductors 24*b*, 25*b*, 64*b* and 65*b* in association with permanent field-producing ferrite bar magnets 89, 90, 91 and 92, likewise to provide the additional magnetic circuits shown in FIGURE 4 with respect thereto. This causes the semiconductor or magneto-resistance elements to be traversed by magnetic fields in opposite directions successively along the two sets of units or elements, and signals through the coupling conductors alternatively aid and oppose the fixed fields on the same axes to modulate the semiconductor elements.

The upper and lower conductors or each pair, as viewed in FIGURE 7, such as 24*a* and 24*b*, for example, are connected in and form part of a series of spaced rectangular loop coils which are connected alternately in opposite polarity or phase relation by alternate upper and lower coupling or end conductors 105 and 106 respectively. With this connection, signal current flow in two adjacent conductor elements is in opposite directions, that is, the signal current flows alternately in opposite directions through the successive loop coils as indicated by the arrowed lines thereon, when serially connected, as in FIGURE 7, through suitable coupling or end conductors 105 and 106.

The signal source in the present circuit is represented by a signal generator 109 having internal resistance $Rg$ represented by the series resistor 110 and coupled to the serially-connected loop coils through circuit leads 111 and 112 and a series variable tuning capacitor 113.

As in the circuit of FIGURE 1 the D.-C. biasing voltage source $V_A$ is represented by the battery 49 with suitable signal bypass capacitor 50, in a control circuit extending serially from the source $V_A$ through the transverse electrodal elements of the successive semiconductor elements 10, 28 and 29 as provided in the circuit 46–47, thence through the coupling or feedback winding 48 and back transversely through the successive elements 82, 81 and 80 to the source $V_A$. The D.-C. power source $V_B$ is likewise represented by the battery 58, provided with the signal bypass capacitor 59, in the series circuit 44–45 which is similarly completed through the feedback coil 48 and the successive semiconductor elements between the series-connected longitudinal electrodes thereof. The signal translating circuit is similar to that in FIGURE 1 except that the two sets or tiers of semiconductor elements are employed and connected in series by a connecting conductor 115, and the feedback signal is applied to the coil 48 through a coupling winding 116 which is effectively in shunt with the output circuit through the capacitor 59, which is across the operating current source $V_B$. The signal output is taken from the output terminals 55 and 56 to any suitable utilization means $R_L$ represented by a load resistor 117. A series coupling capacitor 118 is provided between the output terminal 55 and a high signal potential terminal 119 of the circuit 45 at one end of the winding 116.

The operation of the system is substantially the same as that for the circuit of FIGURE 1, and briefly is as follows:

Input signals from the source 109 at any selected frequency, such as a relatively high frequency, are applied to the series of loop coils through the input circuit leads 111 and 112, causing the permanent magnetic field through each element to be varied at the signal frequency. The biasing or control voltage $V_A$ is set to establish with respect to the voltage $V_B$, the desired voltage relation for the desired sensitivity to magnetic flux change, whereby the signal currents through the successive loop coils serve to modulate the successive elements in the circuit 44–45 with maximum effect and produce a maximum current change in the output or translating circuit for a high degree of signal amplification and application to the output terminals 55–56 and the utilization or load means $R_L$. In this modification of the invention, with additional series elements, a greater magnification of the signal is obtained, and the permanent magnet and signal-variable coupling with the magneto-resistance elements, as well as the biasing and operating voltages, may be relatively low and applied through relatively simple circuit means. This results in low-cost and effective signal amplification at the desired higher frequency ranges.

Figure 8:
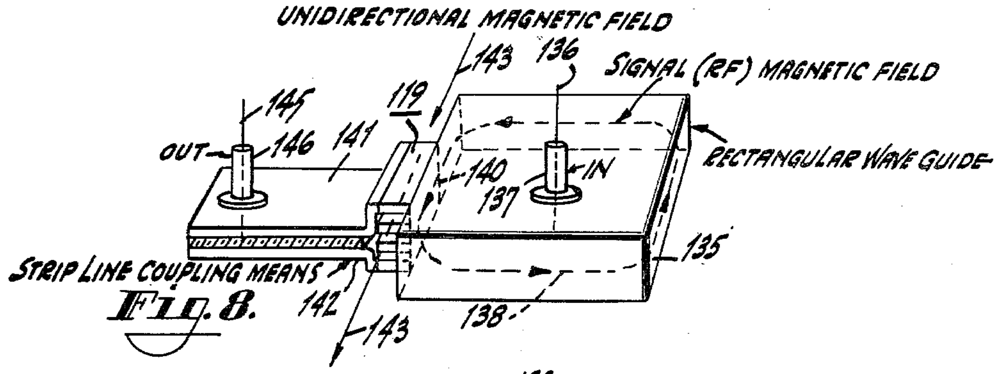
FIGURE 8 is a diagrammatic view, in perspective, of a microwave amplifier structure, illustrating a further modification of the invention.
Figure 9:
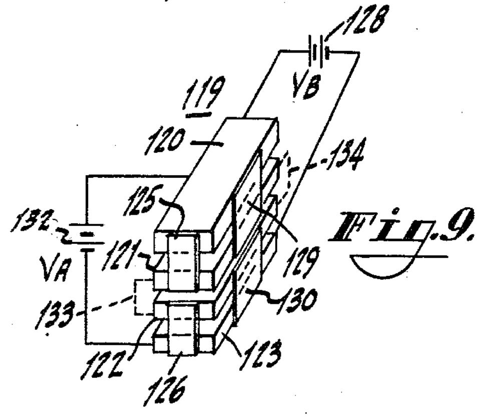
FIGURE 9 is a view in perspective, and on an enlarged scale, of a semiconductor magneto-resistance portion of the circuit structure of FIGURE 8 and the electrical connections therefor.

For microwave signal amplification, the plurality of magneto-resistance elements may be stacked in a compact group instead of being spaced in the extended manner of the circuits of FIGURE 1 and FIGURE 7. Such an arrangement of the units is shown in FIGURES 8 and 9 to which attention is now directed. In this construction a plurality of like semiconductor bodies 120, 121, 122 and 123 of rectangular or wafer configuration are stacked one above the other as shown and are connected by a side and end conductors or electrodes of which the end conductor or electrodes 125 and 126 appear for the circuit of the power source $V_B$, as represented by the battery 128, and of which the side conductors or electrodes 129 and 130 appear for the control voltage source $V_A$, as represented by the battery 132. The transverse and longitudinal electrodal and conductive connections for the respective circuits, which do not appear directly in the drawing, are indicated by the dotted line connections 133 and 134 in FIGURE 9, being similar to those shown.

The biasing or control and operating power supply circuits are substantially the same as in the preceding embodiments except that the end and side electrodes are combined with conductor or connector means for establishing the series connections transversely and longitudinally through the stack of elements for the respective control ($V_A$) and operating or signal translating ($V_B$) circuits.

The input signal for the stack of semiconductor elements is applied to a rectangular wave guide 135 through an input probe conductor 136 extending through the outer shield conductor 137 to the center of the chamber or cavity therein. This provides a strong signal-responsive magnetic field in the wave guide along the side walls thereof as represented by the dotted circular arrowed line 138. The stack 119 of semiconductor wafers is placed at a window 140 in one side wall of the wave guide where the strong signal field exists to modulate the stack magneto-resistively thus varying the resistance in the power supply circuit from the source $V_B$.

The output amplified signal is derived from the stack of wafer elements in cascade aiding relation and is conveyed to any load or utilization circuit through suitable high-frequency coupling means such as a strip line comprising two spaced line conductors or plates 141 and 142 electrically coupled at their spaced ends with the top and bottom elements of the stack, which is thus part of the wave guide. The characteristic impedance of the strip line preferably is substantially the same as the magneto-resistance of the wafer elements of the stack in series.

A biasing unidirectional magnetic field is passed through the stack of semiconductor elements in the direction indicated by the arrowed lines 143, that is, longitudinally of the stack in the direction of the longer axes of the wafers, and in the same mode or direction as the magnetic wave 138 in the wave guide. The biasing or fixed magnetic field is thus opposed and aided to control the magneto-resistance of the stack of elements and to produce an output amplified signal in a similar manner to the other embodiments of the invention. Here the strip-line coupling means is provided with an output circuit connection means represented by an inner shielded coaxial conductor 145 and outer shield conductor 146 therefor which are connected respectively with the strip line conductors 142 and 141 in the present example.

From the foregoing description, it will be seen that a solid-state nonreciprocal amplifier, in accordance with the invention, may be made to operate at relatively high frequencies for signal amplification and control based upon an improved magneto-resistance effect derived from the interaction of two independent sets of electrostatic or electric current fields in addition to the signal-variable modulating magnetic field. The electrical and the magnetic fields are applied to the individual magneto-resistance elements along three different axes which may be related to the rectangular configuration of the semiconductor body of the element corresponding to the axes and dimensional directions of the body.

Furthermore the elements may be connected in tandem or cascade relation for enhanced signal amplification with the application of relatively low magnetic and electrical fields. This circuit relation permits the elements to be mounted in close coupling relation with modulating conducting elements which control the magnetic field variation in response to applied signals. Thus the amplification or signal control in an amplifier or signal translating circuit embodying the invention is enhanced both by the field relation and application to the individual elements and the tandem or cascaded circuit relation provided in connection with a plurality of the operative elements.

The result is a new type of nonreciprocal semiconductor amplifier which will operate at high frequencies with a new enhanced magneto-resistance effect derived from the triple field application to the individual elements and further multiplied by the tandem or cascade relation which is readily provided for a plurality of elements. An amplifier in accordance with the invention thus is adapted as a four-terminal signal translating or amplifier means for extensive use in the active fields provided by present-day communications and computer systems.

The present invention provides effective means for increasing the magneto-resistance control range of a signal translating or amplifier circuit and makes possible effective nonreciprocal oscillator, amplifier, converter or like signal translating circuit at microwave frequencies.

What is claimed is:

1. A magneto-resistance nonreciprocal signal amplifier comprising in combination, a body of semiconductor material having spaced electrodal surface contact elements arranged thereon in opposed pairs along two different axes, means for applying a signal-variable unidirectional magnetic field through said body along a third axis, means connected with said pairs of contact elements for applying direct-current voltages thereto in predetermined magnitude relation to establish electrical fields in said body and a predetermined high degree of sensitivity to said magnetic field variations for magneto-resistance variation of current flow through said body, and a signal translating circuit connected with one of said pairs of contact elements.

2. A magneto-resistance nonreciprocal signal amplifier as defined in claim 1, wherein the means for applying the magnetic field includes a permanent magnet element positioned for establishing said unidirectional field along said third axis, signal conveying conductor elements spaced on opposite sides of and coupled to said body of semiconductor material and input circuit means coupled to said conductor elements for applying input signal currents whereby a variable magnetic field is applied along said third axis in response to applied signal currents.

3. A magneto-resistance nonreciprocal signal amplifier as defined in claim 1, wherein a plurality of said semiconductor bodies each with individual pairs of contact elements and circuit connections therefor are further connected in cascade relation with said direct-current voltage means and said signal translating circuit to provide enhanced signal translation and gain at said signal translating circuit by effective multiplication of the magneto-resistance effect.

4. A magneto-resistance nonreciprocal signal amplifier comprising in combination, a body of semiconductor material having spaced electrodal surface contact elements arranged thereon in opposed pairs along two different axes, of which one is longitudinally of said body and the other is transversely thereof in substantially a common plane, means for applying a transverse signal-variable unidirectional magnetic field through said body along a third axis substantially in orthogonal relation to said plane, means connected with said pairs of contact elements for applying direct-current voltages thereto in predetermined magnitude relation to establish said electrical fields in said body and provide a predetermined high degree of sensitivity to said magnetic field variations for magneto-resistance variation of longitudinal current flow through said body and a signal translating circuit connected with one of said pairs of contact elements.

5. A magneto-resistance nonreciprocal signal amplifier comprising in combination, a rectangular body of semiconductor material having spaced end surfaces on an extended longitudinal axis and two pairs of opposite side surfaces on orthogonally-related transverse axes, a first pair of electrodal contact elements on said end surfaces, a second pair of electrodal contact elements on one pair of said side surfaces, signal conductor means including spaced conductor elements on opposite sides of and extending along said longitudinal axis in inductive coupling relation to said body for applying a signal-variable magnetic field transversely through said body between the other of said pair of side surfaces, a signal circuit connected with said first pair of contact elements, means providing an operating direct-current supply source for said signal circuit and an operating voltage on said first pair of electrodes, and means connected for applying a controlling direct-current voltage to said second pair of contact elements of a magnitude relative to said operating voltage to enhance magneto-resistance variation in said signal circuit and signal translation through said amplifier in response to signal variations of said magnetic field.

6. A magneto-resistance nonreciprocal signal amplifier comprising in combination, a body of semiconductor material having four spaced electrodal surface contact elements arranged thereon in opposed pairs along two different axes, means for applying a signal-variable unidirectional magnetic field through said body along a third and different axis, a signal translating circuit connected with one of said pairs of contact elements, means connected with said one pair of contact elements for applying direct-current operating voltage thereto to establish an electrical current field through said body therebetween and operating current through said signal translating circuit, and means connected with the other of said pairs of contact elements for applying a direct-current biasing voltage thereto of a magnitude relative to that of said operating voltage to provide a predetermined high degree of sensitivity to signal variation of said magnetic field and magneto-resistance variation of operating current flow through said body and the signal translating circuit.

7. A magneto-resistance nonreciprocal signal amplifier comprising in combination, means providing a signal input circuit, means providing a substantially fixed magnetic field along a predetermined axis, a rectangular body of semiconductor material having two pairs of spaced electrodal contact elements thereon, said body providing electrical resistive circuit connections between each of said pairs of electrodal contact elements one transversely and the other longitudinally across said field on two different axes in a common plane, a signal translating circuit connected with a pair of said contact elements to include the longitudinal resistive circuit connection therein, means providing a direct-current energy supply source for said signal translating circuit, means including a plurality of spaced serially-connected inductive coupling elements on opposite sides of said body of semiconductor material said inductive coupling elements being coupled to said signal input circuits for magnetically modulating said body along said first-named axis in response to signal currents applied to said signal input circuit, thereby to vary the resistance of said signal translating circuit by magneto-resistance effect in said body, and means for applying a direct-current electrical field between the other pair of opposite sides of said body of semiconductor material, so that the flow of current through said one pair of electrodal contacts is substantially a function of said applied signals, whereby said magneto-resistance effect and signal amplification through said translating circuit are enhanced.

8. A magneto-resistance nonreciprocal signal amplifier comprising in combination, a plurality of spaced substantially-parallel magneto-resistance elements in a group and each including a rectangular body of semi-conductor material having four spaced electrodal surface contact elements thereon in opposed pairs along two different electrical axes, means for applying a signal-variable magnetic field in aiding relation through each of said bodies along a third axis, means connecting said pairs of contact elements along like axes of each element in series relation to provide two series circuits, means for applying direct-current voltages to each of said series circuits in predetermined relation to establish different electrical fields in said first named axes and provide a predetermined high degree of sensitivity to said magnetic field variations for magneto-resistance variation of current flow through one of said circuits and the electrodal contact elements therefor, and means coupled with said last-named circuit for deriving amplified signals therefrom.

9. A magneto-resistance nonreciprocal amplifier comprising in combination, a plurality of spaced and aligned magneto-resistance elements each including a rectangular wafer of semi-conductor material having four spaced contact elements thereon in opposed pairs along two different electrical axes, a series of signal conductor elements interposed between said magneto-resistance elements in corresponding spaced and aligned relation and connected for applying a signal-variable magnetic field in mutually aiding relation through each of said wafers along a third axis, means connecting said pairs of contact elements along like axes of each element in series relation to provide a series signal translating circuit through one set of like axes and contact elements and a series control circuit through the other set of like axes and contact elements, means for applying direct-current voltages to each of said series circuits in predetermined magnitude relation to establish different electrical fields between contact elements in the two electrical axes of each wafer and provide a predetermined high degree of sensitivity to said magnetic field variations for enhanced magneto-resistance variation of current flow through the signal translating circuit, means providing signal feedback coupling from said signal translating circuit to said control circuit, and means coupled with said signal translating circuit for deriving amplified signals therefrom.

10. A magneto-resistance nonreciprocal signal amplifier comprising in combination, a plurality of spaced and aligned magneto-resistance elements each comprising a rectangular wafer of semi-conductor material with two sets of spaced contacts thereon, circuit means connected to jointly energize said sets of contacts of each wafer at two different direct-current voltages and thereby establish two electric current fields through each wafer in different directions, said direct current voltage having relative values with respect to each other to provide sensitivity to magnetic flux change, a series of permanent-magnet elements positioned and aligned for establishing a fixed magnetic field through each wafer in a third direction and alternatively through said elements in opposite directions, a series of signal conductor means interposed between and along said spaced and aligned magneto-resistance elements and connected for modulating the magnetic fields at signal frequencies to vary the intensity thereof and the magneto-resistance effect through one set of said contacts in each wafer for accumulative enhanced resistance variation of the circuit means connected therewith and signal amplification therein, and signal amplification in response to said magnetic-field intensity variations, means coupled to said wafers of semiconductor material for dynamically maintaining the said relative values of direct-current voltages in operation, and means for deriving amplified output signals from said last-named circuit means.

11. A magneto-resistance nonreciprocal signal amplifier comprising in combination, a plurality of spaced and aligned magneto-resistance elements each comprising a body of semiconductor material having two sets of spaced electrodal contacts thereon, a control voltage circuit connected to jointly energize one set of contacts of each body at one direct-current voltage and thereby establish an electric current field through each body in one direction, a signal translating circuit connected to jointly energize the other set of contacts of each body in series relation at another direct-current voltage and thereby establish a second electric current field through each body in a second direction and operating current through the circuit, a series of permanent-magnet elements positioned and aligned for establishing a fixed magnetic field magnetic field through each body in a third direction, signal conductor means interposed between and along said spaced and aligned magneto-resistance elements for modulating the magnetic fields at signal frequencies to vary the field intensity and a magneto-resistance effect through said other set of contacts and the signal translating circuit and thereby provide accummulative enhanced resistance variation and signal amplification in said circuit, means for establishing the relative values of said direct-current voltages for further enhancing said resistance variation and signal amplification in response to said magnetic field intensity variations, feed-back coupling means between said signal translating and control circuits for dynamically maintaining said relative voltage values in operation, and means for deriving amplified output signals from said signal translating circuit.

12. A magneto-resistance nonreciprocal high-frequency signal amplifier comprising in combination, a plurality of spaced substantially-parallel magneto-resistance elements in a group and each including a rectangular body of semiconductor material having four spaced electrodal surface contact elements thereon in opposed pairs along two different electrical axes, wave-guide means for applying a signal-variable magnetic field through each of said bodies along a third axis, means connecting said pairs of contact elements along like axes of each element in series relation to provide two series circuits, means for applying direct-current voltages to each of said series circuits in predetermined relation to establish different electrical fields in said first named axes and provide a predetermined high degree of sensitivity to said magnetic field variations for magneto-resistance variation of current flow through one of said circuits and the electrodal contact elements therefor, and means coupled with said one of said circuits for deriving amplified signals thereform, said last named means including a strip-line connected with two different elements of said group.

13. A magneto-resistance nonreciprocal high-frequency signal amplifier comprising in combination, a series of semiconductor elements each having electrodal contacts in opposed pairs along two different electrical axes and connected in two corresponding different circuits, means for applying a signal-variable unidirectional magnetic field through said series of semiconductor elements along a third and different axis in each element, means connected with one of said circuits for applying direct-current operating voltage thereto to establish an electrical field through each of said elements along one electrical axis and operating current through said circuit, means connected with the other of said of said circuits for applying a direct-current biasing voltage thereto of a magnitude relative to that of said operating voltage to establish an electrical field through each of said elements along the other electrical axis and provide a predetermined high degree of sensitivity to signal viariation of said magnetic field and magneto-resistance variation of operating current flow through said one circuit, and means for deriving an amplified output signal from said last-named circuit.

14. A magneto-resistance nonreciprocal high-frequency signal amplifier comprising in combination, a series of semi-conductor elements each having electrodal contacts in opposed pairs along two different electrical axes in each element, means for applying a signal-variable unidirectional magnetic field through said elements along a third and different axis in each element, a signal translating circuit connected with one pair of contacts of each semiconductor element, means connected with said signal translating circuit for applying a direct-current operating voltage thereto to establish an electrical field through each of said elements along one of said electrical axes and operating current for said circuit, means connected with the other pair of contacts of each semiconductor element for applying direct-current biasing voltage thereto adjusted in relative magnitude with respect to said operating voltage to establish a second electrical field through each of said elements along the other of said electrical axes and provide a predetermined high degree of sensitivity to said magnetic field variations for magneto-resistance variation of operating current flow through said signal translating circuit and enhanced signal amplification therein, and signal output coupling means connected with said signal translating circuit.

15. A magneto-resistance nonreciprocal system comprising in combination, a body of semiconductor material having spaced electrodal surface contact elements arranged thereon in pairs along different axes, means for applying a signal variable magnetic field through said body along a third axis, an output circuit and a first source of voltage coupled with one of said pairs of contact elements to provide a variation in current through said output circuit resulting from a change in resistance in said body between said one of said pairs of contact elements in accordance with variations in said magnetic field, and means providing a second source of voltage coupled to another of said pairs of contact elements in a polarity with respect to the polarity of said first voltage source to increase the change of resistance in said body between said one of said pairs of contacts with variations of said magnetic field.

No references cited.

ROY LAKE, *Primary Examiner.*

NATHAN KAUFMAN, *Examiner.*

UNITED STATES PATENT OFFICE
CERTIFICATE OF CORRECTION

Patent No. 3,185,937 May 25, 1965

Kern K. N. Chang

It is hereby certified that error appears in the above numbered patent requiring correction and that the said Letters Patent should read as corrected below.

Column 4, line 60, for "uning" read -- tuning --; column 8, line 48, for "FIGURES 1, 3 and 3" read -- FIGURES 1, 3 and 4 --; column 13, line 32, for "opposite sides of" read -- contact elements on --.

Signed and sealed this 19th day of October 1965.

(SEAL)
Attest:

ERNEST W. SWIDER
Attesting Officer

EDWARD J. BRENNER
Commissioner of Patents